(12) United States Patent
Mori et al.

(10) Patent No.: US 6,488,906 B1
(45) Date of Patent: Dec. 3, 2002

(54) METHOD FOR REMOVING NITROGEN OXIDES IN EXHAUST GAS

(75) Inventors: Yoichi Mori, Kanagawa-ken (JP); Kiyomi Arakawa, Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/402,473

(22) PCT Filed: Apr. 10, 1998

(86) PCT No.: PCT/JP98/01653

§ 371 (c)(1),
(2), (4) Date: Oct. 12, 1999

(87) PCT Pub. No.: WO98/46334

PCT Pub. Date: Oct. 22, 1998

(30) Foreign Application Priority Data

Apr. 16, 1997 (JP) ............................... 9-98995

(51) Int. Cl.⁷ ..................... C01B 21/02; C01B 21/22; C01B 21/24; C01B 21/36
(52) U.S. Cl. .................... 423/239.1; 423/235
(58) Field of Search ................. 423/235, 239.1

(56) References Cited

U.S. PATENT DOCUMENTS

| | | | |
|---|---|---|---|
| 3,808,070 A | * | 4/1974 | Jordan |
| 4,002,723 A | * | 1/1977 | Inaba et al. |
| 4,210,628 A | * | 7/1980 | Ninomiya et al. ....... 423/239.1 |
| 4,571,329 A | * | 2/1986 | Kato et al. .................. 422/170 |
| 4,981,659 A | * | 1/1991 | Chuang ..................... 423/235 |
| 5,200,162 A | * | 4/1993 | Riley ....................... 423/239.1 |
| 5,637,282 A | * | 6/1997 | Osburne ..................... 423/235 |
| 5,705,136 A | * | 1/1998 | Drago et al. ............. 423/239.1 |
| 6,056,928 A | * | 5/2000 | Fetzer et al. ................ 423/235 |
| 2002/0044902 A1 | * | 4/2002 | Delahay et al. ............. 423/237 |

FOREIGN PATENT DOCUMENTS

| | | |
|---|---|---|
| EP | 0 222 209 | 5/1987 |
| EP | 0 377 975 | 7/1990 |

OTHER PUBLICATIONS

Derwent Publication, AN 1995–136049, JP 07 060061, XP–002140158, Mar. 7, 1995.

\* cited by examiner

*Primary Examiner*—Stanley S. Silverman
*Assistant Examiner*—Christina Ildebrando
(74) *Attorney, Agent, or Firm*—Oblon, Spivak, McClelland, Maier & Neustadt, P.C.

(57) ABSTRACT

A process for removing nitrogen oxides in exhaust gases is provided. The process comprises mixing an exhaust gas generated during the chemical vapor deposition process for producing semiconductors and containing dinitrogen monoxide ($N_2O$), nitrogen monoxide (NO) and nitrogen dioxide ($NO_2$) with ammonia ($NH_3$) in an amount 0.5–3 times the sum of the stoichiometric amount corresponding to nitrogen monoxide and the stoichiometric amount corresponding to nitrogen dioxide; and then contacting said mixed gas with a noble metal catalyst at a sufficiently high temperature to decompose dinitrogen monoxide, nitrogen monoxide and nitrogen dioxide. Dinitrogen monoxide ($N_2O$), nitrogen monoxide (NO) and nitrogen dioxide ($NO_2$) in exhaust gases can be treated in one step. No $N_2O$ is produced as a by-product.

12 Claims, 3 Drawing Sheets

METHOD FOR REMOVING NITROGEN OXIDES IN EXHAUST GAS

BACKGROUND OF THE INVENTION

1. Field of the Invention

The present invention relates to a process for removing nitrogen oxides, particularly dinitrogen monoxide ($N_2O$) in exhaust gases.

2. Related Art

The selective catalytic reduction process and adsorption process are known for removing nitrogen oxides in exhaust gases discharged from incinerators, boilers and the like.

The selective catalytic reduction process involves adding a reducing agent in the presence of a catalyst to reduce nitrogen oxides ($NO_x$) into a nitrogen gas ($N_2$). The reducing agent preferably used is ammonia ($NH_3$), which selectively reduces nitrogen monoxide (NO) or nitrogen dioxide ($NO_2$) into a nitrogen gas ($N_2$) and water ($H_2O$). The catalyst used includes noble metal catalysts such as palladium and vanadium catalysts such as $V_2O_5$—$WO_3$—$TiO_2$.

On the other hand, the adsorption process involves using a molecular sieve, activated carbon, metal oxide or the like, which physically or chemically adsorbs NO and $NO_2$.

Nitrogen oxides in exhaust gases discharged from incinerators, boilers and the like predominantly contain nitrogen monoxide (NO) and nitrogen dioxide ($NO_2$) with a minor amount of dinitrogen monoxide ($N_2O$). For example, exhaust combustion gases from incinerators may contain 100 ppm of NO, 10 ppm of $NO_2$ and 10 ppm of $N_2O$. Therefore, conventional denitration processes put emphasis on removing nitrogen monoxide and nitrogen dioxide, but overlook removal of dinitrogen monoxide ($N_2O$).

A process for producing semiconductors include a step of performing chemical vapor deposition, which may refer to CVD hereinafter, on wafers. The chemical vapor deposition process sometimes discharges an exhaust gas containing dinitrogen monoxide ($N_2O$) in addition to nitrogen monoxide (NO) and nitrogen dioxide ($NO_2$).

However, the selective catalytic reduction process may produce dinitrogen monoxide ($N_2O$) as a by-product during reduction of nitrogen monoxide (NO) and nitrogen dioxide ($NO_2$) under inappropriately selected conditions. Moreover, the above-mentioned vanadium catalysts are effective to reduce nitrogen monoxide (NO) and nitrogen dioxide ($NO_2$) but ineffective for reducing dinitrogen monoxide ($N_2O$).

The adsorption process can adsorb nitrogen monoxide (NO) and nitrogen dioxide ($NO_2$), but not dinitrogen monoxide ($N_2O$). Moreover, adsorbents used in the adsorption process are readily consumed, and the consumed adsorbents must be replaced. The frequency of replacing adsorbents increases in proportion to an amount of NO and $NO_2$ discharged, resulting in a high running cost.

JPA No. 7826/88 discloses a process for removing dinitrogen monoxide using a palladium catalyst or the like. However, this process removes dinitrogen monoxide after nitrogen monoxide and nitrogen dioxide have preliminarily been removed. This requires a bulky apparatus for removal in at least two steps with lowered heat efficiency. Thus, there is a demand for removing dinitrogen monoxide, nitrogen monoxide and nitrogen dioxide in one step.

Therefore, an object of the present invention is to provide a process for treating an exhaust gas containing dinitrogen monoxide ($N_2O$), nitrogen monoxide (NO) and nitrogen dioxide ($NO_2$) without producing dinitrogen monoxide ($N_2O$) as a by-product.

SUMMARY OF THE INVENTION

The present invention provides a process for removing nitrogen oxides in an exhaust gas, comprising the steps of:

mixing an exhaust gas generated during the chemical vapor deposition process for producing semiconductors and containing dinitrogen monoxide ($N_2O$), nitrogen monoxide (NO) and nitrogen dioxide ($NO_2$) with ammonia ($NH_3$) in an amount 0.5–3 times a sum of a stoichiometric amount corresponding to the nitrogen monoxide and a stoichiometric amount corresponding to the nitrogen dioxide; and contacting said mixed gas with a noble metal catalyst at a sufficiently high temperature to decompose dinitrogen monoxide, nitrogen monoxide and nitrogen dioxide.

Preferably, the present process further comprises, before said contacting step, the step of heating said exhaust gas or said mixed gas at a temperature ranging from 200° C. to said high temperature selected for said contacting step.

During said mixing step, said exhaust gas is preferably mixed with ammonia ($NH_3$) in an amount 0.6–2 times the sum of the stoichiometric amount corresponding to nitrogen monoxide and the stoichiometric amount corresponding to nitrogen dioxide.

Preferably, said mixed gas contains 1 mole part or more of ammonia ($NH_3$) per 1 mole part of an oxygen gas ($O_2$).

Preferably, said exhaust gas contains 1 part by weight of dinitrogen monoxide ($N_2O$), 0.01–3 parts by weight of nitrogen monoxide (NO) and 0.01–100 parts by weight of nitrogen dioxide ($NO_2$).

Preferably, said exhaust gas contains 70% by weight or more, more preferably 80% by weight or more of nitrogen gas.

Also preferably, said exhaust gas is substantially free from sulfur oxides.

Preferably, said noble metal catalyst comprises palladium or platinum.

More preferably, said noble metal catalyst comprises a carrier in a particle form and palladium or platinum supported on said carrier.

Preferably, said contacting step takes place at 250° C. –600° C.

More preferably, said contacting step takes place at 350° C.–400° C.

During said mixing step, the outlet of said exhaust gas and the outlet of said ammonia preferably face to each other.

Preferably, the present process further comprises the step of passing said mixed gas through a tortuous path after said mixing step and before said contacting step.

Preferably, the present process further comprises the step of removing excessive ammonia after said contacting step.

PREFERRED EMBODIMENTS OF THE INVENTION

Figure 1:
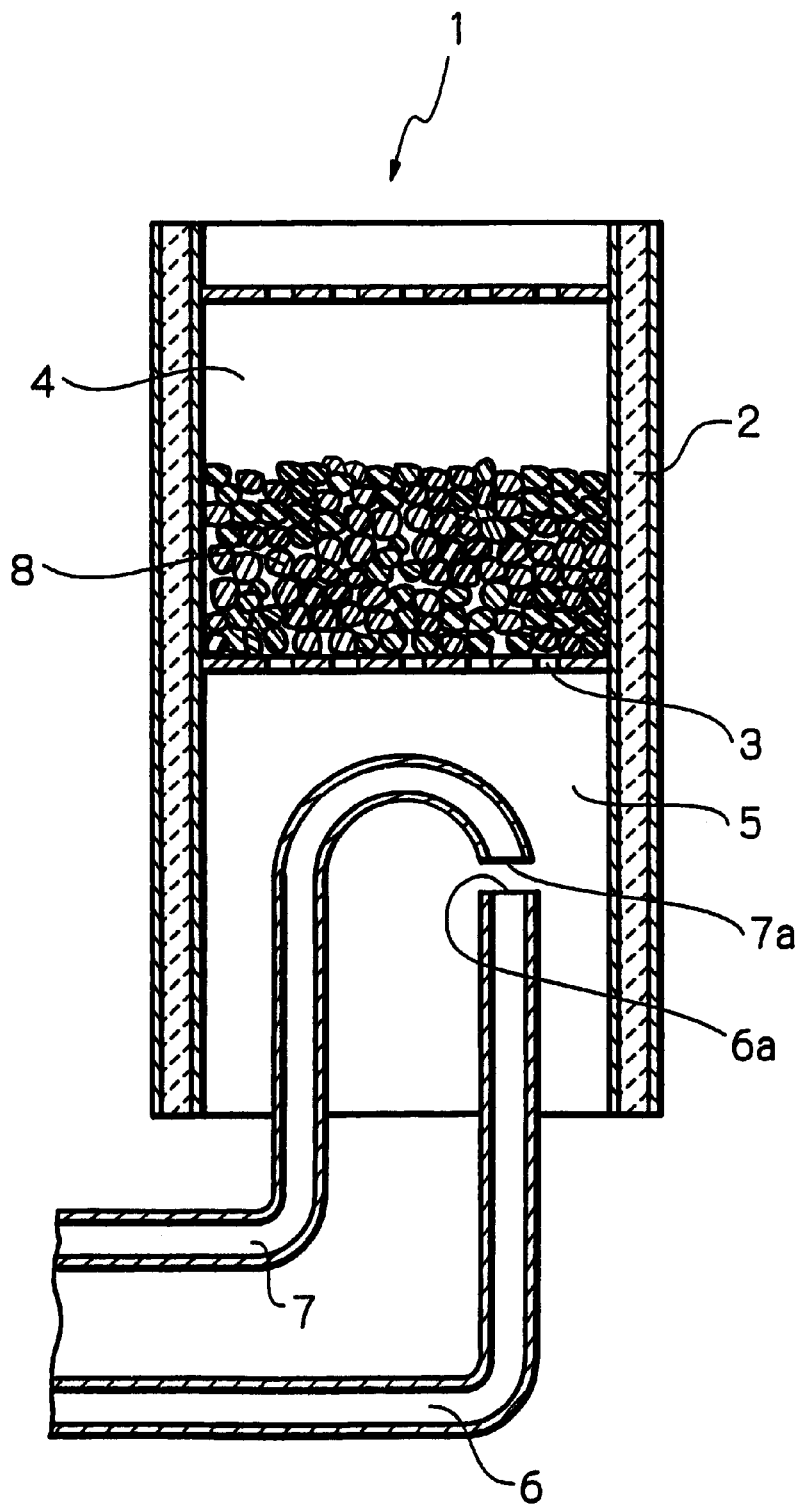
FIG. 1 is a partial sectional view of a packed column suitable for carrying out the present invention.

Preferred embodiments of the present invention will now be described, but are not construed to limit the same.

According to the present invention, an exhaust gas generated during the chemical vapor deposition process for producing semiconductors is treated. This exhaust gas contains dinitrogen monoxide ($N_2O$), nitrogen monoxide (NO) and nitrogen dioxide ($NO_2$). Exhaust gases generated during the chemical vapor deposition process for producing semiconductors are richer in dinitrogen monoxide than nitrogen monoxide, and typically contain 1 part by weight of dinitrogen monoxide ($N_2O$), 0.01–3 parts by weight of nitrogen monoxide (NO) and 0.01–100 parts by weight of nitrogen dioxide ($NO_2$), particularly 1 part by weight of dinitrogen monoxide ($N_2O$), 0.1–1.5 parts by weight of nitrogen monoxide (NO) and 0.01–100 parts by weight of nitrogen dioxide ($NO_2$). In contrast, exhaust gases from incinerators contain, for example, 1 part by weight of dinitrogen monoxide (10 ppm), 10 parts by weight of nitrogen monoxide (100 ppm) and 1 part by weight of nitrogen dioxide (10 ppm).

The balance of the exhaust gas may be a nitrogen gas, an oxygen gas and inevitabe impurities. For example, the exhaust gas may comprise 1 part by weight of dinitrogen monoxide ($N_2O$), 0.01–3 parts by weight of nitrogen monoxide (NO), 0.01–100 parts by weight of nitrogen dioxide ($NO_2$) and 0.01–100 parts by weight of an oxygen gas with the balance being a nitrogen gas and inevitable impurities. For example, the exhaust gas preferably contains 70% by weight or more, more preferably 80% by weight or more, most preferably 90% by weight or more of a nitrogen gas ($N_2$). The exhaust gas may contain 0.1–10% by weight, especially 0.5–5% by weight of an oxygen gas.

Preferably, said exhaust gas is substantially free from sulfur oxides. Alternatively, a denitration process may take place after any sulfur oxides in the exhaust gas have been removed. This is because sulfur oxides may be a catalytic poison to a noble metal catalyst.

According to the present invention, said exhaust gas is mixed with ammonia ($NH_3$) in an amount 0.5–3 times, preferably 0.6–2 times, more preferably 0.8–1.5 times the sum of the stoichiometric amount corresponding to nitrogen monoxide and the stoichiometric amount corresponding to nitrogen dioxide. If ammonia is added in an amount less than 0.6 times the sum, nitrogen monoxide and nitrogen dioxide can not be sufficiently removed. If ammonia is added in an amount more than 3 times the sum, the burden of removing excessive ammonia downstream of the denitration apparatus increases.

Decomposition reactions of nitrogen oxides in the presence of noble metal catalysts are shown as follows.

Decomposition of dinitrogen monoxide requires neither ammonia nor an oxygen gas. However, ammonia acts as a reducing agent for nitrogen monoxide and nitrogen dioxide. An oxygen gas contributes to decomposition of nitrogen monoxide. This oxygen gas may be initially contained in the exhaust gas or added thereto if necessary.

One mole of nitrogen monoxide reacts with one mole of ammonia. Accordingly, the stoichiometric amount of ammonia corresponding to one mole of nitrogen monoxide means one mole. One mole of nitrogen dioxide reacts with 4/3 moles of ammonia. Accordingly, the stoichiometric amount of ammonia corresponding to one mole of nitrogen dioxide means about 1.33 moles. Therefore, 1.40 moles (0.6×2.33 moles) to 7.0 moles (3×2.33 moles) of ammonia should be added to treat an exhaust gas containing 1 mole of nitrogen monoxide and 1 mole of nitrogen dioxide according to the present invention.

Preferably, said mixed gas contains 1 mole part or more of ammonia ($NH_3$) per 1 mole part of oxygen ($O2$) gas. As described above, this oxygen gas may be or may not be initially contained in the exhaust gas.

Preferably, the process of the present invention further comprises, before said contacting step, the step of heating said exhaust gas or said mixed gas at a temperature ranging from 200° C. to said high temperature selected for the contacting step. Thus, formation of ammonium nitrate can be suppressed.

During this heating step, said exhaust gas and ammonia may be introduced into a mixing chamber having a heater, in which the mixed gas may be heated. In this case, the outlet of said exhaust gas and the outlet of said ammonia preferably face to each other within the mixing chamber. This allows ammonia to vaporize to reduce the danger of explosion.

Alternatively, the exhaust gas may be preheated during this heating step, followed by addition of unheated or preheated ammonia. In this case, the process preferably further comprises the step of passing said mixed gas through a tortuous path after said mixing step and before said contacting step. The exhaust gas and ammonia can be homogeneously mixed through the tortuous path.

According to the present invention, said mixed gas is contacted with a noble metal catalyst at a sufficiently high temperature to decompose dinitrogen monoxide, nitrogen monoxide and nitrogen dioxide, after the mixing step. Thus, only dinitrogen monoxide but also nitrogen monoxide and nitrogen dioxide are decomposed.

The sufficiently high temperature to decompose dinitrogen monoxide, nitrogen monoxide and nitrogen dioxide can be appropriately selected by those skilled in the art, depending on the noble metal catalyst. In case of a palladium catalyst or the like, this high temperature is preferably 250° C.–600° C., more preferably 350° C.–400° C. Noble metal catalysts are activated at high temperatures. Noble metal catalysts supported on alumina or the like normally resist to a temperature up to 600° C. and thus exhibit catalytic activity at a temperature of 600° C. or less. Below 250° C., the reaction rate is low and therefore unpreferable. Temperature control may be conveniently performed with a sensor such as a thermocouple. However, operation above 400° C. is not preferable in view of heat resistance of typical heated packed columns and power costs of the heater.

Said noble metal catalyst preferably comprises palladium or platinum. More preferably, it comprises a carrier in a particle form and palladium or platinum supported on said carrier. Suitable carriers include ceramics such as alumina, silica, titanium oxide, etc. Ceramics are preferably oxide ceramics, more preferably porous. The carrier in a particle form may have configurations of a sphere, a rotary ellipsoid, a cylinder defining a bore extending in an axial direction, etc.

In carrying out the present invention, the following packed column can be used, for example.

FIG. 1 is a partial sectional view showing an embodiment of a packed column 1 suitable for carrying out the present invention.

The packed column has a vertically extending cylinder and a horizontal diaphragm 3 with a plurality of vent holes. A heater 2 is embedded within the sidewall of the cylinder. The diaphragm 3 partitions the inside of the cylinder into upper and lower portions. A packed chamber 4 packed with a noble metal catalyst is provided in the upper portion of the cylinder partitioned by the diaphragm 3, while a gas mixing chamber 5 is provided in the lower portion of the cylinder. An exhaust gas inlet tube 6 and an ammonia inlet tube 7 open into the gas mixing chamber 5. The outlet 6a of the exhaust gas inlet tube 6 and the outlet 7a of the ammonia inlet tube 7 face to each other.

An exhaust tube not shown communicating with the packed chamber 4 extends from the outlet of the packed column to the outside of the packed column 1 to reach a water scrubber column.

The packed chamber 4 is packed with a Pd catalyst as a treating agent. The Pd catalyst 8 preferably comprises 0.5–1.0% by weight of Pd supported on a porous material such as alumina based on $Al_2O_3$. The shape of the porous material carrying Pd is not critical in principle, but preferably spherical in view of handling. The sphere preferably has a diameter of 3–6 mm. If the diameter exceeds 6 mm, it may be difficult to ensure a preferred, sufficient surface area per unit volume for reaction contact. If the diameter is less than 3 mm, the catalyst unpreferably has high resistance to air permeability. The Pd catalyst is used at 250° C.–600° C., preferably 350° C.–400° C.

In carrying out the present invention, an exhaust gas containing nitrogen oxides is introduced into the gas mixing chamber 5 in the packed column 1 from the exhaust gas inlet tube 6 and mixed with ammonia introduced from the ammonia inlet tube 7. The temperature of the gas phase in the gas mixing chamber 5 where the exhaust gas and $NH_3$ are mixed is preferably 200° C. or more. Temperatures lower than 200° C. are not preferred because a reaction for producing powdery $NH_4NO_3$ is more liable to occur between $NO_2$ and $NH_3$ when the content of nitrogen oxides, particularly $NO_2$ is high. $NH_4NO_3$ is solid at ambient temperatures. If a powder is produced and accumulated in the packed column 1, it may block a tubing, which necessitates another device for removing the powder together with maintenance thereof. In addition, $NH_4NO_3$ is a hazardous material (Class 1 in Art. 2 of the Japanese Fire Protection Law), which needs special care for handling for safety reasons. If a large amount of $NH_4NO_3$ powder accumulates in the packed column 1, this situation by itself would involve a great danger of accident. $NH_4NO_3$ decomposes at about 210° C. to produce water and $N_2O$. At a temperature of 200° C. or more, formation of $NH_4NO_3$ can be effectively suppressed. Therefore, the exhaust gas and $NH_3$ may be mixed at a temperature of 200° C. or more.

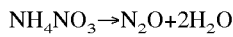

The exhaust gas and ammonia may be introduced into the mixing chamber 5 in either down flow or up flow.

When the packed column 1 described above is used, the exhaust gas and ammonia are mixed together in the mixing chamber 5 and gradually moved into the packed chamber 4, where they come into contact with a Pd catalyst at 350° C.–400° C. for oxidation-reduction reactions.

The mixed gas having passed through the packed chamber 4 runs through an exhaust tube not shown extending therefrom to reach a water scrubber column, where an excessive, unreacted $NH_3$ gas is removed. Then, only an environmentally safe gas can be diffused into the atmosphere.

Figure 2:
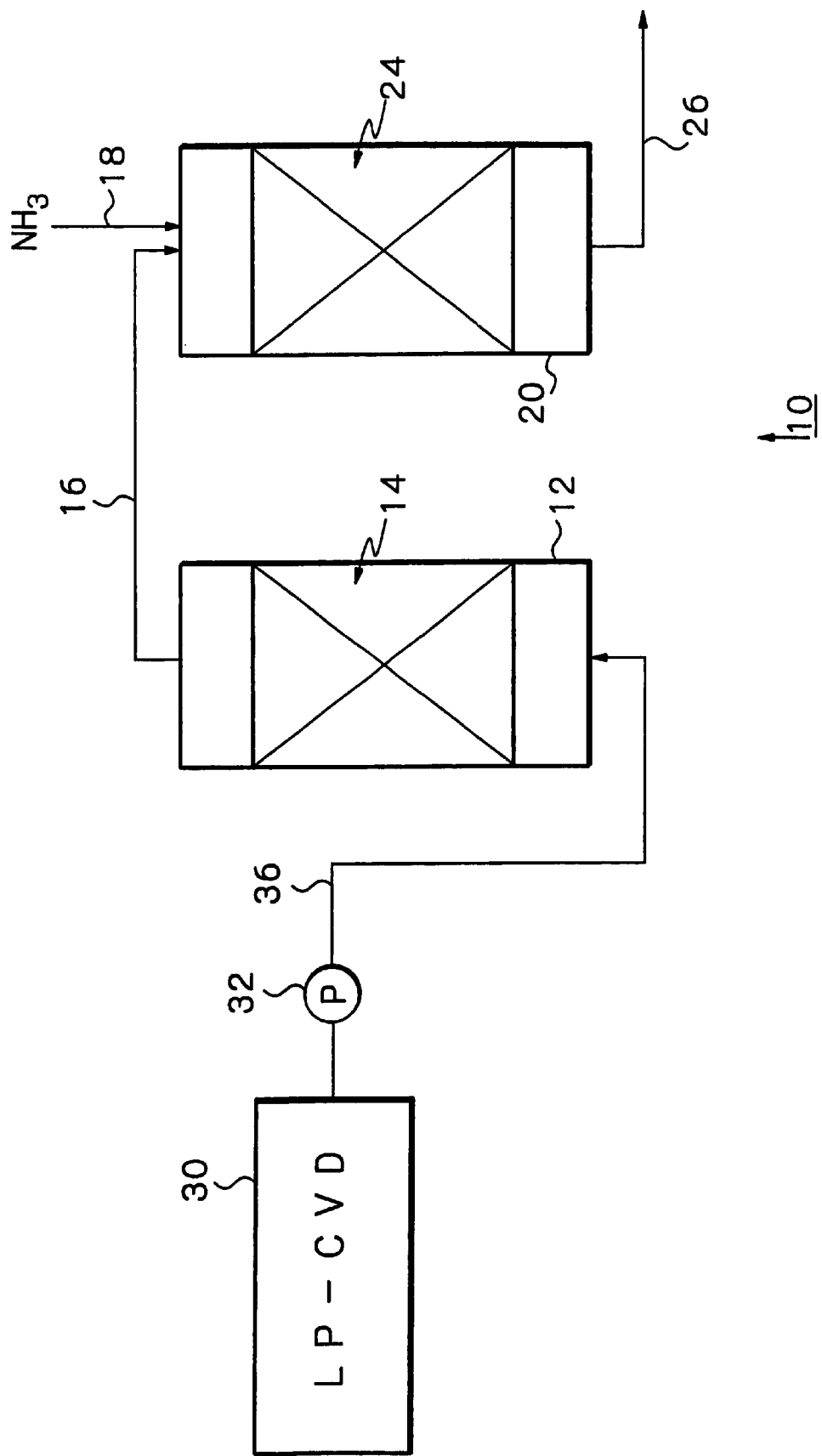
FIG. 2 is a block diagram of a denitration apparatus suitable for carrying out the present invention.

In carrying out the present invention, a denitration apparatus 10 shown in FIG. 2 can also be used, for example.

In FIG. 2, the denitration apparatus 10 has a preheating chamber 12 and a reaction chamber 20. The preheating chamber 12 is preferably packed with ceramic particles 14 to enhance heat transfer. The preheating chamber 12 is connected to a chemical vapor deposition apparatus 30 for producing semiconductors via a line 36. An exhaust gas discharged from the chemical vapor deposition apparatus 30 is introduced into the lower portion of the preheating chamber 12 via a pump 32 and heated to 200° C. or more, for example.

Figure 3:
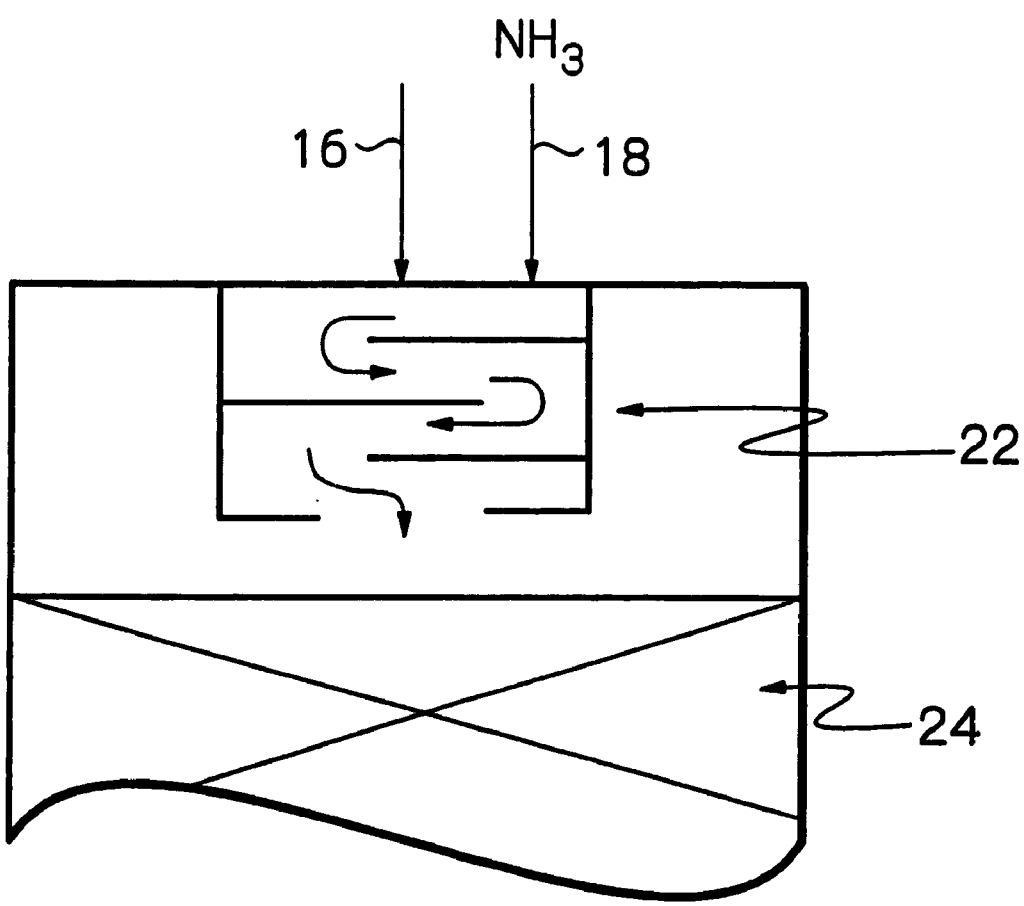
FIG. 3 is a partial enlarged view of a reaction chamber.

The preheating chamber 12 is connected to an inlet of the reaction chamber 20 via a line 16. An ammonia line 18 is also connected to the inlet of the reaction chamber 20. As shown in FIG. 3, a baffle 22 for meandering the gas is preferably provided at the inlet of the reaction chamber 20. The exhaust gas and ammonia can be homogeneously mixed through this tortuous path.

The reaction chamber 20 is packed with a noble metal catalyst 24, which may be similar to the noble metal catalyst as shown in FIG. 1. The reaction chamber 20 is equipped with a heater not shown, which can heat the noble metal catalyst at a high temperature such as 250° C.–600° C., for example. The heater may be provided within the sidewall of the reaction chamber 20 in the same manner as shown in FIG. 1, for example. Nitrogen oxides in the exhaust gas are decomposed within the reaction chamber 20.

The gas having passed through the reaction chamber 20 is introduced into a scrubber column via a line 26 to remove an excessive, unreacted $NH_3$ gas.

The following examples illustrate the present invention, but are not construed as limiting the same.

EXAMPLES

Reference Examples 1–6, 13 and 14

A packed column 1 or mini-column having a diameter of 25 mm made from quartz and equipped with a ceramic heater 2 in its sidewall as shown in FIG. 1 was prepared, which includes a gas mixing chamber 5 in the lower stage and a packed chamber 4 having a bed height of 100 mm in the upper stage. The packed chamber 4 was packed with a Pd catalyst 8 comprising 0.5% by weight of Pd supported on alumina in a particle form of 3–6 mm in a particle diameter, and the mixing chamber and packed chamber were each fitted with a thermocouple temperature sensor not shown.

The inside of the packed column was heated from the sidewall by the ceramic heater to maintain the temperature of the gas phase in the gas mixing chamber 5 at 265° C.–290° C. and the temperature of the packed chamber 4 at 350° C.–360° C.

A gas containing any one of nitrogen oxide gases selected from NO, $NO_2$ and $N_2O$ and $O_2$ was introduced into the gas mixing chamber 5 via an exhaust gas inlet tube 6. A nitrogen gas was used as a carrier. Namely, nitrogen oxide and oxygen gases were added to a nitrogen gas as a carrier. In Table 1, the concentrations of nitrogen oxide and oxygen gases are expressed as percent by weight based on the total of nitrogen oxide, oxygen and nitrogen gases. The total flow rate of the exhaust gas was 408 sccm, and SV was 500 $hr^{-1}$.

Similarly, an $NH_3$ gas was introduced via an ammonia inlet tube 7. The carrier for the ammonia gas was a nitrogen gas, and ammonia concentrations in Table 1 are expressed as percent by weight based on the total of ammonia gas and the nitrogen gas. The inlet gas concentrations of nitrogen oxides were about 1%, and the influent amount of the $NH_3$ gas was at least equimolar to $O_2$ in the exhaust gas introduced via the exhaust gas inlet tube 6.

At the column outlet from which an exhaust tube extends to the outside of the mini-column, gas concentrations of nitrogen oxides were analyzed. Analytical methods used were the reactor tube method for NO, $NO_2$ and $NH_3$, the GC-MS method for $N_2O$, and the GC-TCD method for $O_2$. Analytical results of gases at the outlet after gas circulation for 2 hours are shown in Table 1, revealing that all of NO, $NO_2$ and $N_2O$ have been removed to levels below detection limits. No deposition of $NH_4NO_3$ was observed at the inner face of the gas mixing chamber 5 where the gas phase was maintained at a temperature of 200° C. or more. However, some deposition of $NH_4NO_3$ was observed at places where the temperature of the gas phase was lowered to 80° C.–95° C.

TABLE 1

| Reference example | Treatment agent | Controlled temperature of treatment bed (° C.) | Inlet gas concentration ||||| Outlet gas concentration |||||
|---|---|---|---|---|---|---|---|---|---|---|---|---|
| | | | NO (%) | NO$_2$ (%) | N$_2$O (%) | O$_2$ (%) | NH$_3$ (%) | NO (ppm) | NO$_2$ (ppm) | N$_2$O (ppm) | O$_2$ (%) | NH$_3$ (ppm) |
| 1 | Pd/Al$_2$O$_3$ | 350 | 0.95 | — | — | 3.1 | 3.8 | <1 | <1 | <1 | <0.1 | 10500 |
| 2 | Pd/Al$_2$O$_3$ | 350 | 0.95 | — | — | 3.1 | 4.9 | <1 | <1 | <1 | <0.1 | 21000 |
| 3 | Pd/Al$_2$O$_3$ | 350 | — | 0.93 | — | 3.4 | 3.9 | <1 | <1 | <1 | <0.1 | 3900 |
| 4 | Pd/Al$_2$O$_3$ | 350 | — | 0.89 | — | 2.7 | 4.6 | <1 | <1 | <1 | <0.1 | 3500 |
| 5 | Pd/Al$_2$O$_3$ | 350 | — | — | 0.96 | 2.8 | 3.2 | <1 | <1 | <1 | <0.1 | <1 |
| 6 | Pd/Al$_2$O$_3$ | 350 | — | — | 0.96 | 3.1 | 4.3 | <1 | <1 | <1 | <0.1 | 10000 |
| 13 | Pd/Al$_2$O$_3$ | 350 | 0.95 | 0.93 | 0.96 | 3.1 | 3.8 | <1 | <1 | <1 | <0.1 | <1 |
| 14 | Pd/Al$_2$O$_3$ | 350 | 0.034 | 0.39 | 0.11 | 5.2 | 5.8 | <1 | <1 | <1 | <0.1 | <4800 |

Note:
In the above and the following tables, "—" means that the indicated gas was not introduced.

Reference Examples 7–11

In Reference examples 7–11, the same experimental equipment and the same catalyst as in References 1–6 and 13 were used. However, the influent amount of NH$_3$ gas was less than an equimolar amount to O$_2$ in the exhaust gas introduced via the exhaust gas inlet tube 6.

Analytical results of gases at the outlet after gas circulation for 2 hours are shown in Table 2. All of NO, NO$_2$ and N$_2$O were detected at high concentration values. These results show a remarkable decrease in treatment efficiency.

Reference Example 12

In Reference example 12, the same experimental equipment as in References 1–6 and 13 was used. However, the denitration catalyst used was a commercially available V$_2$O$_5$—WO$_3$—TiO$_2$ catalyst in the form of fragments having a particle diameter of 4–7 mm. The influent amount of NH$_3$ gas was at least equimolar to O$_2$ in the exhaust gas introduced with nitrogen oxide via the exhaust gas inlet tube 6.

Analytical results of a gas at the outlet after gas circulation for 2 hours are shown in Table 3. Both of NO and NO$_2$ were below detection limits. However, N$_2$O as a by-product was detected in a gas at the outlet.

TABLE 2

| Reference example | Treatment agent | Controlled temperature of treatment bed (° C.) | Inlet gas concentration ||||| Outlet gas concentration |||||
|---|---|---|---|---|---|---|---|---|---|---|---|---|
| | | | NO (%) | NO$_2$ (%) | N$_2$O (%) | O$_2$ (%) | NH$_3$ (%) | NO (ppm) | NO$_2$ (ppm) | N$_2$O (ppm) | O$_2$ (%) | NH$_3$ (ppm) |
| 7 | Pd/Al$_2$O$_3$ | 350 | 0.95 | — | — | 4.2 | 1.9 | 1000 | 750 | 7700 | 2.0 | <1 |
| 8 | Pd/Al$_2$O$_3$ | 350 | 0.95 | — | — | 2.9 | 2.4 | 460 | 180 | 8400 | <0.1 | <1 |
| 9 | Pd/Al$_2$O$_3$ | 350 | — | 0.93 | — | 3.1 | 2.1 | 200 | 180 | 1500 | 2.9 | <1 |
| 10 | Pd/Al$_2$O$_3$ | 350 | — | 0.93 | — | 6.0 | 2.3 | 300 | 200 | 2600 | 2.4 | <1 |
| 11 | Pd/Al$_2$O$_3$ | 350 | — | — | 0.96 | 3.2 | 2.3 | 200 | 240 | 14200 | 0.3 | <1 |

TABLE 3

| Reference example | Treatment agent | Controlled temperature of treatment bed (° C.) | Inlet gas concentration ||| Outlet gas concentration |||||
|---|---|---|---|---|---|---|---|---|---|---|
| | | | NO$_2$ (%) | O$_2$ (%) | NH$_3$ (%) | NO (ppm) | NO$_2$ (ppm) | N$_2$O (ppm) | O$_2$ (%) | NH$_3$ (ppm) |
| 12 | V$_2$O$_5$—WO$_3$—TiO$_2$ | 350 | 0.92 | 2.8 | 4.4 | <1 | <1 | 270 | <0.1 | 20600 |

According to the present invention, dinitrogen monoxide ($N_2O$), nitrogen monoxide (NO) and nitrogen dioxide ($NO_2$) in exhaust gases can be treated in one step without producing $N_2O$ as a by-product.

What is claimed is:

1. A process for removing nitrogen oxides in an exhaust gas, comprising:

mixing an exhaust gas generated during the chemical vapor deposition step of a process for producing semiconductors and containing dinitrogen monoxide ($N_2O$), nitrogen monoxide (NO), nitrogen dioxide ($NO_2$) and oxygen with ammonia ($NH_3$), wherein the amount of ammonia mixed into the exhaust gas is at least one mol. per mol. of oxygen in the exhaust gas; and contacting said mixed gas with a noble metal catalyst at a temperature ranging from 250° C. to 600° C. to decompose dinitrogen monoxide, nitrogen monoxide and nitrogen dioxide in one step.

2. The process of claim 1, further comprising, before said contacting step, heating said exhaust gas or said mixed gas at a temperature ranging from 200° C. to 600° C. selected for said contacting step.

3. The process of claim 1, wherein said exhaust gas is mixed with ammonia ($NH_3$), wherein the amount of $NH_3$ ranges from 0.6–2 times the sum of the stoichiometric amount corresponding to the nitrogen monoxide and the stoichiometric amount corresponding to the nitrogen dioxide during said mixing step.

4. The process of claim 1 wherein said exhaust gas contains 1 part by weight of the dinitrogen monoxide ($N_2O$), 0.01–3 parts by weight of the nitrogen monoxide (NO) and 0.01–100 parts by weight of the nitrogen dioxide ($NO_2$).

5. The process of claim 1 wherein said exhaust gas contains 70% by weight or more of a nitrogen gas ($N_2$).

6. The process of claim 1 wherein said exhaust gas is substantially free from sulfur oxides.

7. The process of claim 1 wherein said noble metal catalyst comprises palladium or platinum.

8. The process of claim 1 wherein said noble metal catalyst comprises a carrier in a particle form and palladium or platinum supported on said carrier.

9. The process of claim 1 wherein said contacting step takes place at 350° C.–400° C.

10. The process of claim 1, wherein in the mixing of ammonia with the exhaust gas, the gases are mixed as they are discharged individually from outlets facing each other.

11. The process of claim 1, further comprising a step of passing said mixed gas through a tortuous path before said contacting step.

12. The process of claim 1, further comprising a step of removing excess ammonia after said contacting step.

* * * * *

UNITED STATES PATENT AND TRADEMARK OFFICE
CERTIFICATE OF CORRECTION

PATENT NO. : 6,488,906 B1  
DATED : December 3, 2002  
INVENTOR(S) : Mori et al.

It is certified that error appears in the above-identified patent and that said Letters Patent is hereby corrected as shown below:

<u>Title page,</u>
Item [45] and the Notice information should read as follows:

-- [45] **Date of Patent: \*Dec. 3, 2002**

[\*]  Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Twenty-ninth Day of April, 2003

JAMES E. ROGAN
*Director of the United States Patent and Trademark Office*